Aug. 14, 1951   G. C. LONG   2,564,223
VALVE
Original Filed April 3, 1945
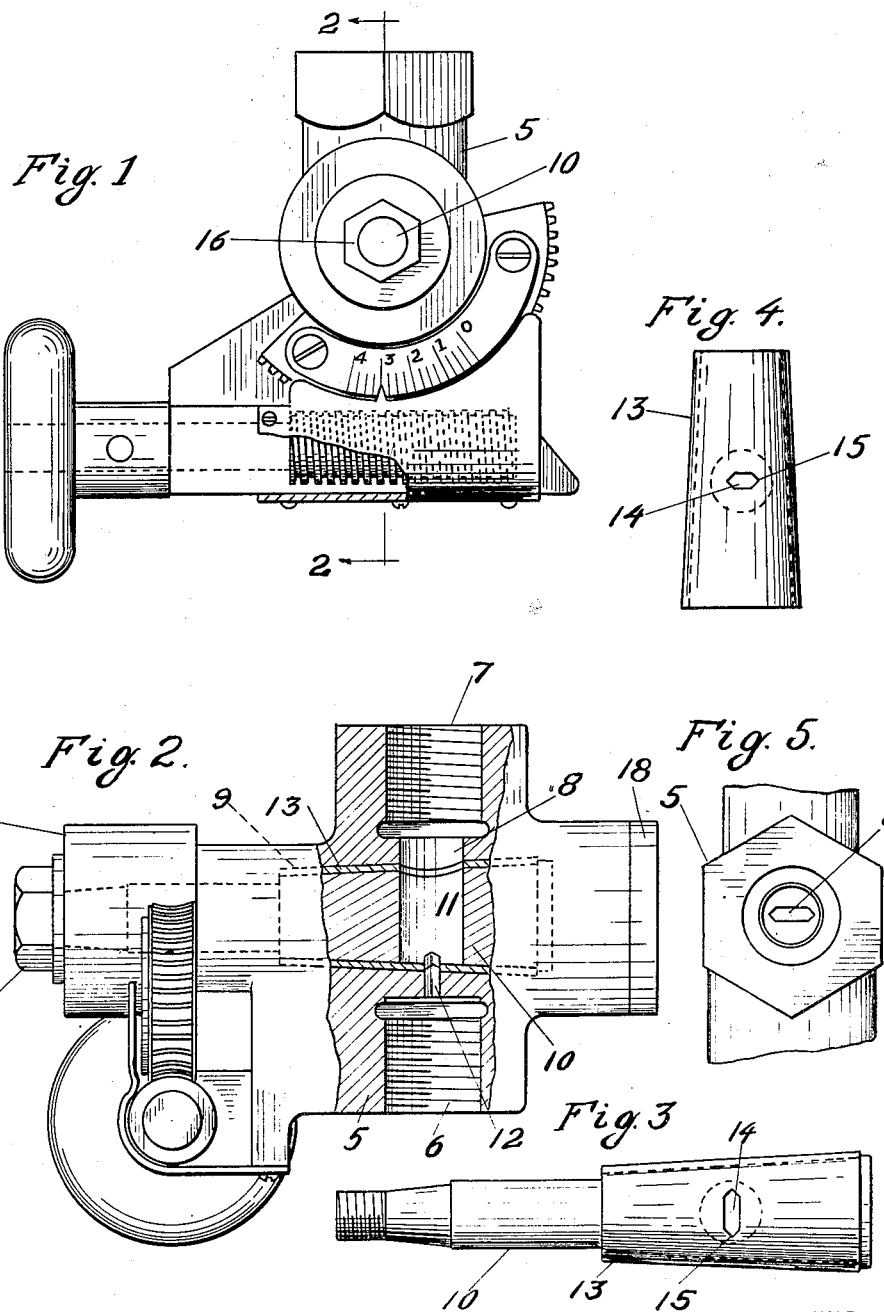
INVENTOR.
GROVER C. LONG.
BY
Bernard F. Garvey Patented Aug. 14, 1951

2,564,223

UNITED STATES PATENT OFFICE 2,564,223

VALVE

Grover C. Long, Washington, D. C.

Application August 6, 1945, Serial No. 609,154

1 Claim. (Cl. 251—92)

This invention comprises a valve and is a continuation in part of my copending application, Serial Number 586,353 filed April 3, 1945 which matured to Patent Number 2,554,040 on May 22, 1951.

After much experiment I have found that the satisfactory results obtained with the valve of my previous application are considerably amplified by substituting removable orifice sleeves for the orifice plates, the sleeves with various sizes of orifices being expeditiously interchangeable to vary the capacity range of the valve, whereby fluids and liquids of different viscosity and variable pressures may be accommodated by the simple expedient of changing the valve sleeve.

It is a further object of this invention, as a result of my experiments, to utilize a standard tapered valve plug and housing, with the housing and opening being of a size and shape to complement any desired capacity range within the dimensions of the supply pipe, the plug being adapted for the reception of any one of a series of sleeves having an opening complementing the housing opening, the ends of the opening of each sleeve and the housing being V-shaped to provide a pin-point opening through the valve housing at the option of the user.

Other objects of the invention will be apparent from the following description of the present preferred form of the invention, taken in connection with the accompanying drawings, wherein:

Figure 1 is a front elevational view of a valve constructed in accordance with the present invention, a part thereof being broken away;

Figure 2 is a sectional view taken on line 2—2 of Figure 1, looking in the direction of the arrows, a part of the valve being shown in side elevation;

Figure 3 is an elevational view of the valve plug and sleeve constructed in accordance with the present invention;

Figure 4 is a side elevational view of the valve sleeve per se; and

Figure 5 is a fragmentary front elevational view of the valve housing, looking at the inlet end thereof.

In order to illustrate the application of the invention, I have, in Figure 1, shown a valve housing 5 which is of the same construction as illustrated in my previous application. The housing is provided with inlet and outlet openings 6 and 7 respectively, as illustrated in Figure 2. The bores of these openings may be screw-threaded for the reception of complentally threaded supply and outlet pipes. An intermediate part of the opening connecting the inlet and outlet 6 and 7 is constricted as indicated at 8. The housing is provided with a tapered opening 9 which extends completely through the housing at right angles to the openings 6, 7 and 8 and communicates with the latter as shown in Figure 2.

The tapered opening 9 is adapted for the reception of an interfitting valve plug 10 which has an opening 11 extending therethrough, said opening being in communication with the opening 8 and inlet and outlet 6 and 7. It will also be noted upon reference to Figure 2, that the inlet 6 is provided at its inner end with a constricted passage 12, the ends of which are preferably V-shaped, as shown to advantage in Figure 5.

The valve plug 10 is adapted for the reception of any one of a series of sleeves 13, the sleeves being of identical conformation, except in a variation in an inlet opening provided in the wall of the sleeve, approximately midway its ends. The inlet opening, designated 14, may be of any desired shape and size, but I have found from experiment that it is desirable to provide an opening with parallelly arranged spaced walls, the ends of which taper to points, as indicated at 15. The largest opening of any one of the sleeves 13 will be of identical conformation to the opening 12 in the valve housing 5. However, since the ends of the valve housing opening 12 and the ends of the sleeve opening 14 taper to points, it is possible to provide for a pin-point opening into the valve plug at the option of the user. This has the advantage of eliminating the possibility of minute particles of dirt, grit or foreign material bridging over the aperture and stopping flow of fluid or liquid through the valve when it is partially open. In addition, this allows an infinitesimal adjustment of the valve to correspondingly permit a minimum volume of liquid or fluid to pass through the valve without any variation in the latter, for an indefinite period of time. By making the sleeves removable, the size of the opening for the discharge of the fluid or liquid may be varied to better adapt the valve for fluids and liquids varying in viscosity and density with due consideration for pressure differentials.

The size of the orifice in the sleeve 13 is changed by the simple expedient of sliding the sleeve from the plug 10. This may be conveniently done by disengaging a single nut 16 which permits removal of a valve housing hood 17, and permits the plug 10 to be removed from the valve housing through the end thereof by removing the cap 18, and as more fully explained and detailed in my aforementioned co-pending application S. N. 586,353.

I have also found that the present type of valve may be machined with greater accuracy than where the orifice plate of my present invention is employed. In addition, more facile operation of the valve is permitted in fitting the plug into the valve body and with certain liquids and fluids, the orifice sleeve is preferred to the orifice plate.

Although I have herein described a preferred form of the invention, it is to be understood that various changes may be made within the scope of the appended claim.

What I claim is:

A valve comprising a housing provided with inlet and outlet openings and a restricted passage at the inner end of the inlet opening, said passage having opposite parallel walls and substantially V-shaped end walls connecting said parallel walls, a plug having a snug working fit in the housing between the inlet and outlet openings and provided with a through opening for establishing communication between the aforementioned inlet and outlet openings, and a sleeve removably embracing said plug provided with diametrically opposed openings aligned with the through opening in said plug, each of the openings in said sleeve having V-shaped ends complementing the end walls of the restricted inlet passage and cooperable with the aforementioned inlet passage for effecting a pin-point communicating opening between the inlet opening of the casing and the through opening in the plug upon proper adjustment of the latter.

GROVER C. LONG.

REFERENCES CITED

The following references are of record in the file of this patent:

UNITED STATES PATENTS

| Number | Name | Date |
| --- | --- | --- |
| 1,638,152 | Gabriel | Aug. 9, 1927 |
| 1,674,743 | Rudolph | June 26, 1928 |
| 1,931,048 | Wiener | Oct. 17, 1933 |

FOREIGN PATENTS

| Number | Country | Date |
| --- | --- | --- |
| 431,838 | Germany | Sept. 18, 1923 |